United States Patent
Draper et al.

(10) Patent No.: US 12,356,278 B2
(45) Date of Patent: *Jul. 8, 2025

(54) SERVICE AREA DETERMINATION IN A TELECOMMUNICATIONS NETWORK

(71) Applicant: Level 3 Communications, LLC, Denver, CO (US)

(72) Inventors: Shawn Draper, Shawnee, KS (US); Vamsi Kaza, Monroe, LA (US); Jerry Matthews, Grove City, OH (US); William Gray, Boulder, CO (US)

(73) Assignee: Level 3 communications, LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/666,442

(22) Filed: May 16, 2024

(65) Prior Publication Data

US 2024/0305953 A1    Sep. 12, 2024

Related U.S. Application Data

(63) Continuation of application No. 18/144,364, filed on May 8, 2023, now Pat. No. 11,991,585, which is a
(Continued)

(51) Int. Cl.
*H04L 67/51* (2022.01)
*G06F 16/29* (2019.01)
(Continued)

(52) U.S. Cl.
CPC ............ *H04W 4/021* (2013.01); *G06F 16/29* (2019.01); *H04L 67/133* (2022.05); *H04L 67/51* (2022.05);
(Continued)

(58) Field of Classification Search
CPC ....... H04W 4/02; H04W 4/029; H04W 4/023; H04W 4/021; H04W 4/025; H04W 4/024;
(Continued)

(56) References Cited

U.S. PATENT DOCUMENTS 7,085,697 B1    8/2006  Rappaport
7,620,716 B2    11/2009 Pirzada et al.
(Continued)

FOREIGN PATENT DOCUMENTS

WO    WO-199966738    12/1999
WO    WO-2014093717    6/2014

OTHER PUBLICATIONS

Canadian Examination Report, dated Feb. 8, 2024, Application No. 3130892, filed Feb. 19, 2020; 4 pgs.
(Continued)

*Primary Examiner* — Allahyar Kasraian

(57) ABSTRACT

Implementations described and claimed herein provide systems and methods for correlating one or more service areas of a network with one or more geolocation coordinates to determine available services for customers to the network. A service polygon may be generated that define an area in which a particular service offered by a communications network is available. The boundaries of the service polygons may be adjusted based on information corresponding to physical features of the initial area. The service polygons may aid a communications network in providing a list of available services to potential customers or devices connected to the network by determining one or more geolocation coordinate values of a potential connection site and comparing the values to the service polygons. A network management system may determine the available services, current or in the future, to offer such services to a customer to the network.

17 Claims, 7 Drawing Sheets

Related U.S. Application Data continuation of application No. 17/698,226, filed on Mar. 18, 2022, now Pat. No. 11,647,355, which is a continuation of application No. 16/795,321, filed on Feb. 19, 2020, now Pat. No. 11,284,215.

(60) Provisional application No. 62/968,811, filed on Jan. 31, 2020, provisional application No. 62/808,183, filed on Feb. 20, 2019, provisional application No. 62/808,189, filed on Feb. 20, 2019.

(51) Int. Cl.
*H04L 67/133* (2022.01)
*H04W 4/021* (2018.01)
*H04W 4/029* (2018.01)
*H04Q 11/00* (2006.01)

(52) U.S. Cl.
CPC ........ *H04W 4/029* (2018.02); *H04Q 11/0067* (2013.01)

(58) Field of Classification Search
CPC ... H04W 64/003; H04W 16/18; H04W 64/00; G06F 16/29; H04L 67/18; H04L 41/22; H04L 41/06; H04L 41/12; H04L 41/14; H04L 67/16; H04L 67/40; G06Q 30/0205; G06Q 30/0236; H04Q 11/0067
See application file for complete search history.

(56) References Cited

U.S. PATENT DOCUMENTS

| | | | |
|---|---|---|---|
| 8,565,404 | B2 | 10/2013 | Shaffer et al. |
| 10,142,187 | B2 | 11/2018 | Nahata |
| 2007/0079376 | A1 | 4/2007 | Robert |
| 2009/0222540 | A1 | 9/2009 | Mishra et al. |
| 2009/0296584 | A1 | 12/2009 | Bernard et al. |
| 2013/0317945 | A1 | 11/2013 | Doleweerd et al. |
| 2014/0280160 | A1 | 9/2014 | Scriffignano |
| 2015/0332364 | A1* | 11/2015 | Davis ................ G06Q 30/0613 705/26.41 |
| 2015/0373207 | A1 | 12/2015 | Day et al. |
| 2016/0077538 | A1 | 3/2016 | Berka |
| 2017/0004437 | A1 | 1/2017 | Clemenson |
| 2017/0116626 | A1 | 4/2017 | Ramamoorthy |
| 2018/0198871 | A1 | 7/2018 | Walker |
| 2018/0300783 | A1 | 10/2018 | LoPresti |
| 2019/0101402 | A1 | 4/2019 | Chien |
| 2020/0049532 | A1 | 2/2020 | Levac |
| 2020/0267498 | A1 | 8/2020 | Draper |
| 2022/0210603 | A1 | 6/2022 | Draper |
| 2023/0283982 | A1 | 9/2023 | Draper |

OTHER PUBLICATIONS

Canadian Examination Report, dated Jun. 15, 2023, Application No. 3130892, filed Feb. 19, 2020; 3 pgs.
Canadian Examination Report, dated Jun. 7, 2023, Application No. 3130893, filed Feb. 19, 2020; 2 pgs.
Extended European Search Report, dated Feb. 22, 2023, Application No. 20758518.3, Filed Feb. 19, 2020; 13 pgs.
Extended European Search Report, dated Sep. 8, 2022, Application No. 22168217.2, filed Feb. 19, 2020; 13 pgs.
International Preliminary Report on Patentability, dated Sep. 2, 2021, Int'l Appl. No. PCT/US20/01887; Int'l Filing Date Feb. 19, 2020; 9 pgs.
International Preliminary Report on Patentability, dated Sep. 2, 2021, Int'l Appl. No. PCT/US20/018885, Int'l Filing Date Feb. 19, 2020; 10 pgs.
International Preliminary Report on Patentability, dated Sep. 2, 2021, Int'l Appl. No. PCT/US20/018892, Int'l Filing Date Feb. 19, 2020; 11 pgs.
International Search Report and Written Opinion of the International Searching Authority, dated Jul. 16, 2020, Int'l Appl. No. PCT/US20/018877, Int'l Filing Date Feb. 19, 2020; 13 pgs.
International Search Report and Written Opinion of the International Searching Authority, dated Jun. 10, 2020, Int'l Appl. No. PCT/US20/018892, Int'l Filing Date Feb. 19, 2020; 15 pgs.
International Search Report and Written Opinion of the International Searching Authority, dated Jun. 2, 2020, Int'l Appl. No. PCT/US20/018885, Int'l Filing Date Feb. 19, 2020; 13 pgs.
Partial Supplementary European Search Report, dated Nov. 21, 2022, Application No. 20758518.3, filed Feb. 9, 2020; 16 pgs.
Ouali, Anis et al., "Towards Achieving Practical CPON FTTH Designs", IEEE 20th International Workshop on Computer Aided Modeling and Design of Communication Links and Networks (CAMAD) 2015 , pp. 108-113.
Ucar, Inaki et al., "simmer: Discrete-Event Simulation for R", Arxiv.org, Cornell Univ. Library, 201 Olin Library Cornell Univ Ithaca, NY 14853; XP081453789 May 27, 2017 , pp. 1-31.

* cited by examiner

SERVICE AREA DETERMINATION IN A TELECOMMUNICATIONS NETWORK

TECHNICAL FIELD

Aspects of the present disclosure generally relate to methods and systems for implementing a telecommunications or data network, and more specifically for systems and methods for determining geographic areas in which particular services of the telecommunications network are available based on geolocations of the network infrastructure structure for delivering a service and other geolocation of the location to which a service will be connected.

BACKGROUND

Telecommunication networks provide, among other functions, Internet, voice and many other services for customers that may have different possible service requirements. Such communications networks generally include one or more wire centers dispersed in the regions serviced by the network. A wire center connects to various sites, such as living units, business units, and the like, associated with customers. The wire center is connected to such units with one or more communications nodes, such as cross connects. Each of the communications nodes may involve a different node type, such as copper-fed internet protocol (CoIP), fiber to the node (FTTN), fiber to the home/fiber to the premise (FTTH/FTTP), etc. The node type generally dictates the type of services that may be provided to a customer. In addition, the node type may limit the service area for a particular service. For example, a CoIP node may have a smaller service area than an FTTH/FTTP node for providing high-speed Internet, or such a service may not be available for certain kinds of nodes. Also, physical impairments (e.g., rivers, lakes, mountains, easement rights, etc.) of an area surrounding a node may limit the availability of services from the node. Determining which services are available in an area or location may be difficult and may be influenced by many factors, both of the network providing the service and the surrounding area.

In addition, determining the services available from a communications network at a customer site or location often references the address of the customer. However, building addresses are often unreliable or do not accurately reflect a particular geographic location. For example, many addresses are not assigned to a residential building until a person moves into the building and may take several months for address databases to be updated. A homeowner that moves into a newly built home may have to wait several months to receive an address. If the homeowner requests communication services at the home, a network manager may be unable to determine if such services are available to the home. Further, large plots of land may be associated with a single address correlated to a position along a street. However, the availability of services across the entire plot of land may differ from that available at the address location. For these and other reasons, associating building addresses with an available service of a communications network has potential for significant inaccuracies, leading to inefficient operation of the communications network.

It is with these observations in mind, among others, that aspects of the present disclosure were conceived.

SUMMARY

One implementation of the present disclosure may take the form of a method for operating a network. The method may include the operations of obtaining geolocation coordinates of an address received at a computing device, the received address corresponding to a potential termination site for a communications network and obtaining, based on the geolocation coordinates and from a database in communication with the computing device, a service area polygon comprising a plurality of geographic boundaries defining an area of an available network service and which contains the geolocation coordinates of the potential termination site. The method may also include the operations of correlating, in a service map of a geographic area, the service area polygon with the geolocation coordinates of the potential termination site, wherein the correlation corresponds to an availability of the network service to the potential termination site and displaying the correlation of the service area polygon with the geolocation coordinates of the potential termination site in the service map.

Another implementation of the present disclosure may take the form of a system for managing a network including a communication port communicating with a database maintaining geolocation coordinate values corresponding to an address, a processor in communication with the communication port to receive the geolocation coordinate values, and a non-transitory memory comprising instructions encoded thereon. The instructions, when executed by the processor, are operable to generate a service polygon comprising a plurality of geographic boundaries defining an area of a network service based on a geographic location of network equipment configured to provide the network service, obtain the service polygon, based on a determination that the geolocation coordinate values are located within the plurality of geographic boundaries of the service polygon, and display, in a service map, an overlay of the geolocation coordinate values corresponding to the address and the service polygon associated with the network service.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
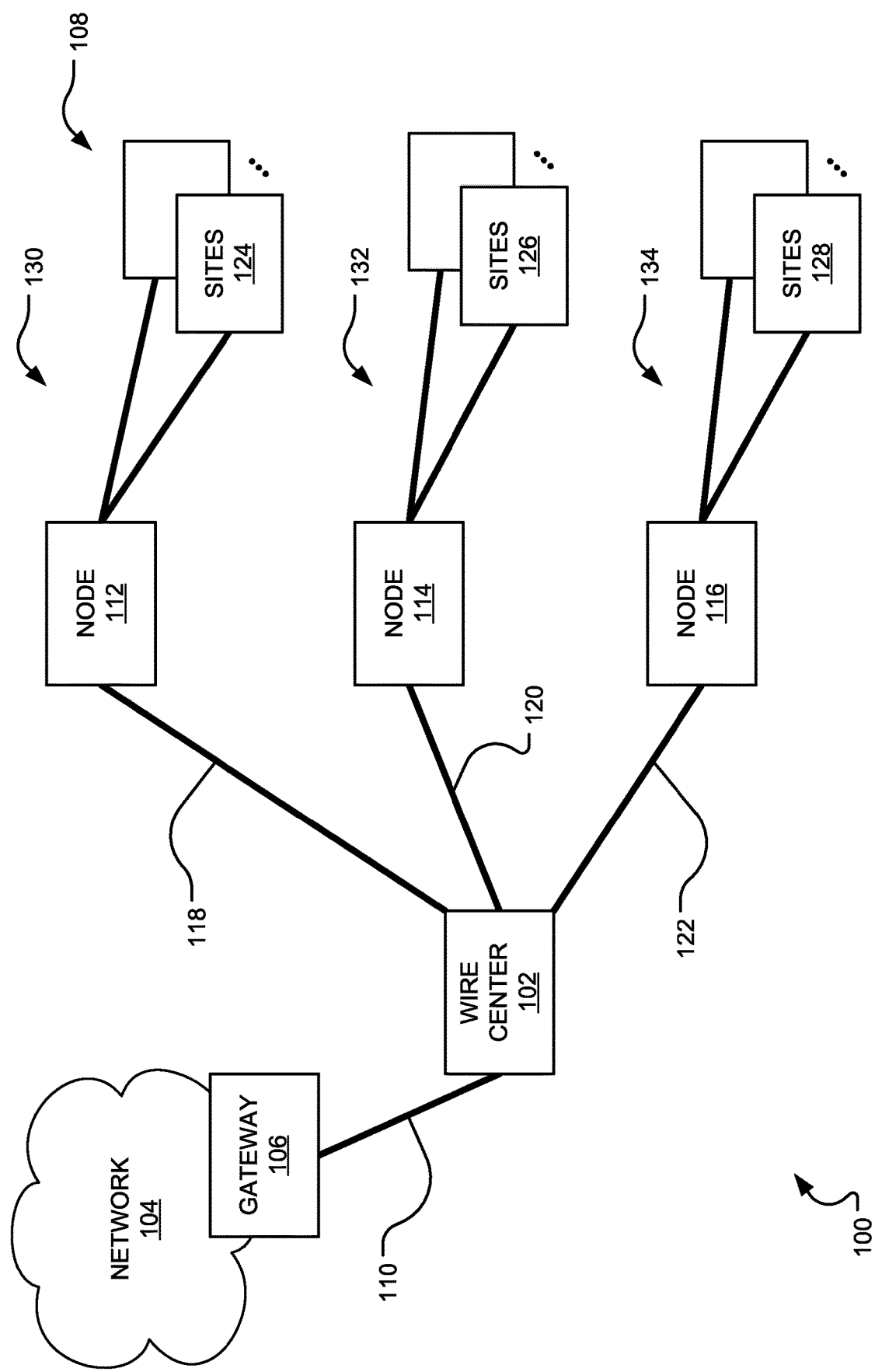
FIG. 1 is a block diagram showing an example network environment with one or more communication nodes which may be used in implementing embodiments of the present disclosure.

Aspects of the present disclosure include systems, methods, networking devices, and the like for correlating one or more service areas (also known as "polygons" or "service polygons") with one or more geolocation coordinates. In one implementation, the service polygons define, in relation to geographic coordinates (e.g., latitude and longitude coordinates) an area in which a particular service offered by a communications network is available. The service boundary defined by a polygon may be based on engineering specifications of wire centers or nodes of the communications network and technical limitations of the networking equipment operating at those wire centers or nodes. In association with installation or some other aspect of activating network equipment, the network equipment may be geolocated to a coordinate system, such as a latitude and longitude system. An initial service boundary, the volume of which may be considered a service area, may be generated from the geolocation of the network equipment and the technical aspects of the networking equipment. Further, the boundaries of the service polygon may be altered or adjusted based on information corresponding to physical features of the initial service boundary. For example, water boundaries (lakes, streams, rivers, etc.), land boundaries (hills, mountains, ravines, etc.), buildings or other man-made structures, limitations on placement of transmission lines, and the like, may place limitations on providing transmission lines and, therefore, some services of the communications network to a site or area. Based on information obtained from a database of land-based information (such as a topology map or satellite image), the boundaries of the service polygon may be adjusted to account for land-based constraints on providing a service. In some instances, portions of the service area (portions of the interior a service polygon) may be removed from the polygon to indicate areas in which a particular network service is not available.

The service polygons may aid a communications network in providing a list of available services to potential customers or devices connected to the network. For example, an address associated with a request for a service may be received at a network management system. The address may correspond to a client site at which a customer requests one or more services from the network. To account for inconsistencies in address databases, the provided address may be associated with one or more geolocation coordinate values, such as longitude and latitude values. The coordinate values may be provided to a customer to verify the accuracy of the correlation to the provided address. For example, a map including the estimated location of the provided address may be displayed within a user interface or otherwise provided to the requesting customer. The customer may provide input or feedback to verify or alter the estimated coordinates of the service location. With the customer coordinate values determined, one or more service polygons that include the customer coordinates may be obtained from the service polygon database. The service polygons that include the customer coordinates may indicate the services available to the customer coordinate location, without tying the services to a particular address. In some instances, a service polygon may indicate a possible future available service corresponding to the customer geolocation. A network management system may then provide an estimated availability of future services to the requesting customer based on the service polygon. Through the application of the service polygons based on a geolocation coordinate system to a received service request geolocation, the network system may determine the available services, current or in the future, to offer such services to a customer to the network.

To begin a detailed description of an example network environment 100, reference is made to FIG. 1. In one implementation, the network environment 100 includes one or more wire centers 102. A network will include wire centers dispersed in the geographical regions serviced by the network. Each of the wire centers 102 is part of a network 104 comprising numerous network components for communicating data across the network 104 and to provide telecommunication services, such as broadband or other Internet services, to end users 108, such as existing or potential customers. The network 104 may be managed by or otherwise associated with a telecommunications provider, such as a large Internet Service Provider (ISP), that facilitates communication and exchanges network traffic to provide the telecommunication services. For example, the network 104 may be a large network with a backbone stretching over a large geographical region, such as the United States. The network 104 may be in communication with various other networks that provide access to the network 104 to the end users 108 for receiving telecommunications services. In one implementation, the wire center(s) 102 are in communication with the network 104 via a gateway 106. The wire center(s) 102 may be connected to the gateway 106 with a high-bandwidth fiber 110.

Generally, each of the wire centers 102 includes central office switches providing connection to the network 104 and deploying network components enabling telecommunications services for the end user 108. In one implementation, one or more communications nodes, such as cross connects or other network connection devices, communicate data between the wire center 102 and one or more sites associated with the end users 108 via one or more trunks, fibers, and/or other transmission channels between points. Each of the sites may involve a connection with a physical building, such as a business or residence, associated with one or more of the end users 108. For example, the site may be a living unit that is a single family home or a living unit that is part of a multiple dwelling unit, such as an apartment complex. A site may further be a business unit that is a single commercial unit or part of a multiple unit commercial complex. For simplicity, FIG. 1 depicts "sites" but, as noted, the sites may be associated with a residence, commercial complex, and any other location where a network connection is provided. Thus, a site generally refers to that where service exists or potentially can be deployed.

One or more of the communications nodes 112-116 has a node type determined based on the type of networking equipment installed at the node. For example, the node type may be copper-fed internet protocol (CoIP), Fiber to the Node (FFTN), Fiber to the Premises (FTTP) (also referred to as Fiber to the House (FTTH)), and/or the like. In the illustrative, non-limiting example shown in FIG. 1, a node 112 has a node type of CoIP, a node 114 has a node type of FTTN, and a node 116 has a node type of FTTP. In this example, the node 112 is connected to the wire center 102 via a copper trunk 118 and connected to one or more sites 124 with a copper twisted pair 130 to provide Direct to Subscriber Line (DSL) services. The node 114 is connected to the wire center 102 with fiber 120 and connected to one or more sites 126 with a copper twisted pair 132 to provide DSL services. Finally, the node 116 is connected to the wire center 102 with fiber 122 and to one or more sites 128 with fiber 134 in a Gigabyte Passive Optical Network (GPON) architecture.

There are benefits and drawbacks to each of these node types. The CoIP node type of the node 112 and the FTTN node type of the node 114 each involve the copper twisted pairs 130 and 132, with each channel of the pairs 130 and 132 communicating in opposite directions between the nodes 112/114 and each of the sites 124/126, respectively. In these cases, the node 112/114 includes a box housing the connection to the wire center 102 and the pair of connections for each site. The FTTN node type of the node 134 deploys the DSL equipment closer in physical proximity to the sites 126 than the CoIP node type of the node 132, reducing signal attenuation and increasing internet speed. To facilitate the closer proximity, however, a power pedestal and equipment cabinet are deployed at the node 134, increasing operational costs.

Figure 2:
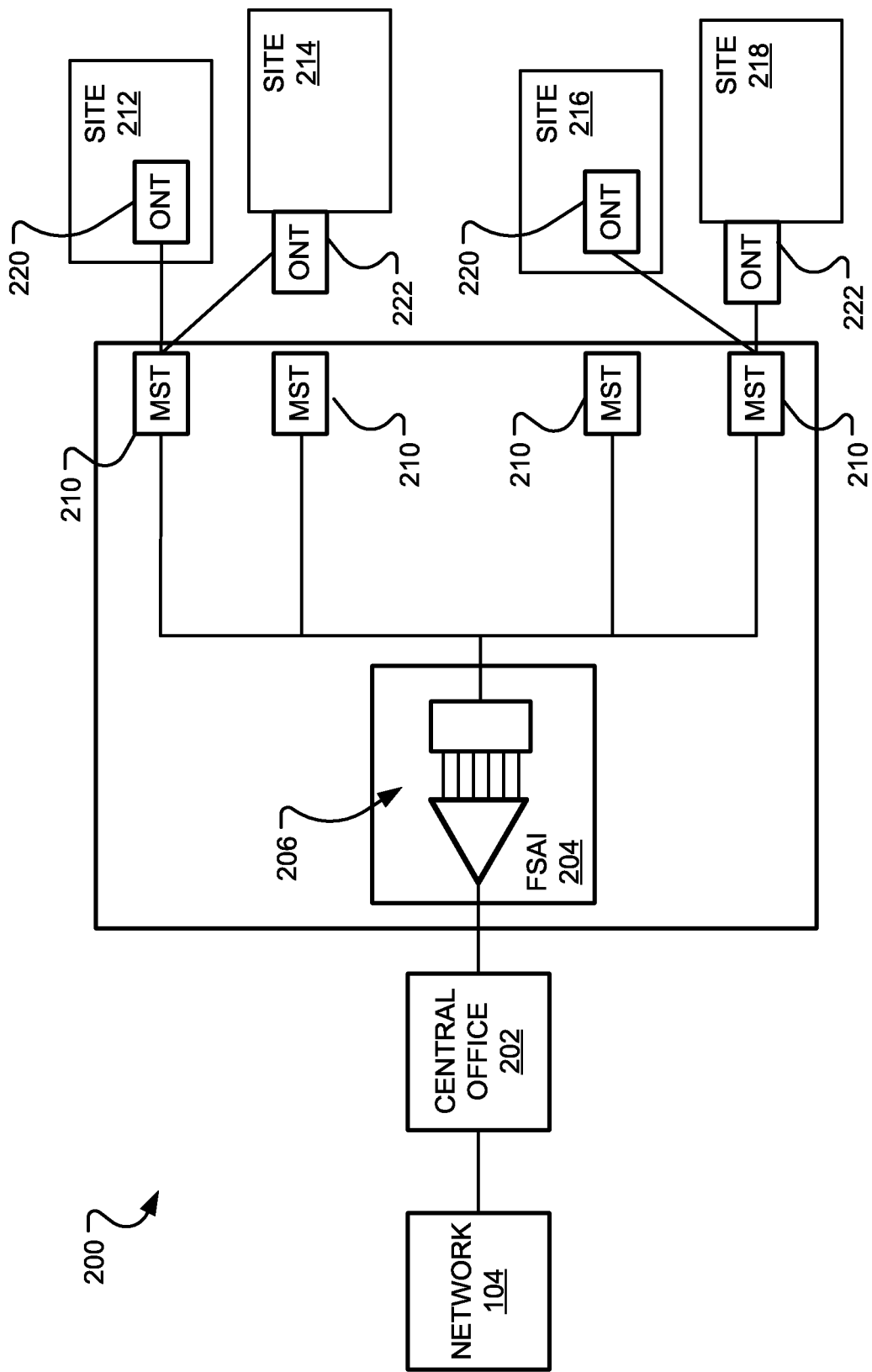
FIG. 2 is a schematic diagram illustrating a second network operating environment for implementing embodiments of the present disclosure.

On the other hand, the FTTP node type of the node 116 eliminates the need for the power pedestal and equipment cabinet. The GPON architecture involved with the node 116 utilizes one fiber 122 providing two way communication between the sites 128 and the wire center 102. In particular, FIG. 2 is a schematic diagram illustrating an Optical Distribution Network (ODN) operating environment for implementing embodiments of the present disclosure. In the shown implementation, the ODN network 200 may include a central office 202 to connect to the network 104. Generally, the bandwidth for the fiber 122 is high enough that it replaces the individual wires of other node types that are deployed to each site. The central office 202 may connect to a fiber serving area interface (FSAI) 204 that includes a passive optical splitter 206 for splitting the incoming optical signal into different wavelengths. A light distribution fiber may connect the FSAI 204 to one or more multiport service terminals (MSTs) 210. Although the MSTs 210 of FIG. 2 are illustrated as serving two sites 212-218, each MST may terminate a particular number of fibers of the light distribution fiber and typically may serve 8-12 termination sites or end users. Each end user or site 212-218 may include an inside Optical Network Terminal (ONT) 220 or outside ONT 222 for communicating with a corresponding MST and providing the communication services to the corresponding site. Through the ODN 200, fiber connections are provided to sites from a network 104 to provide available services to those sites, such as high-speed internet or other communication services.

Figure 3:
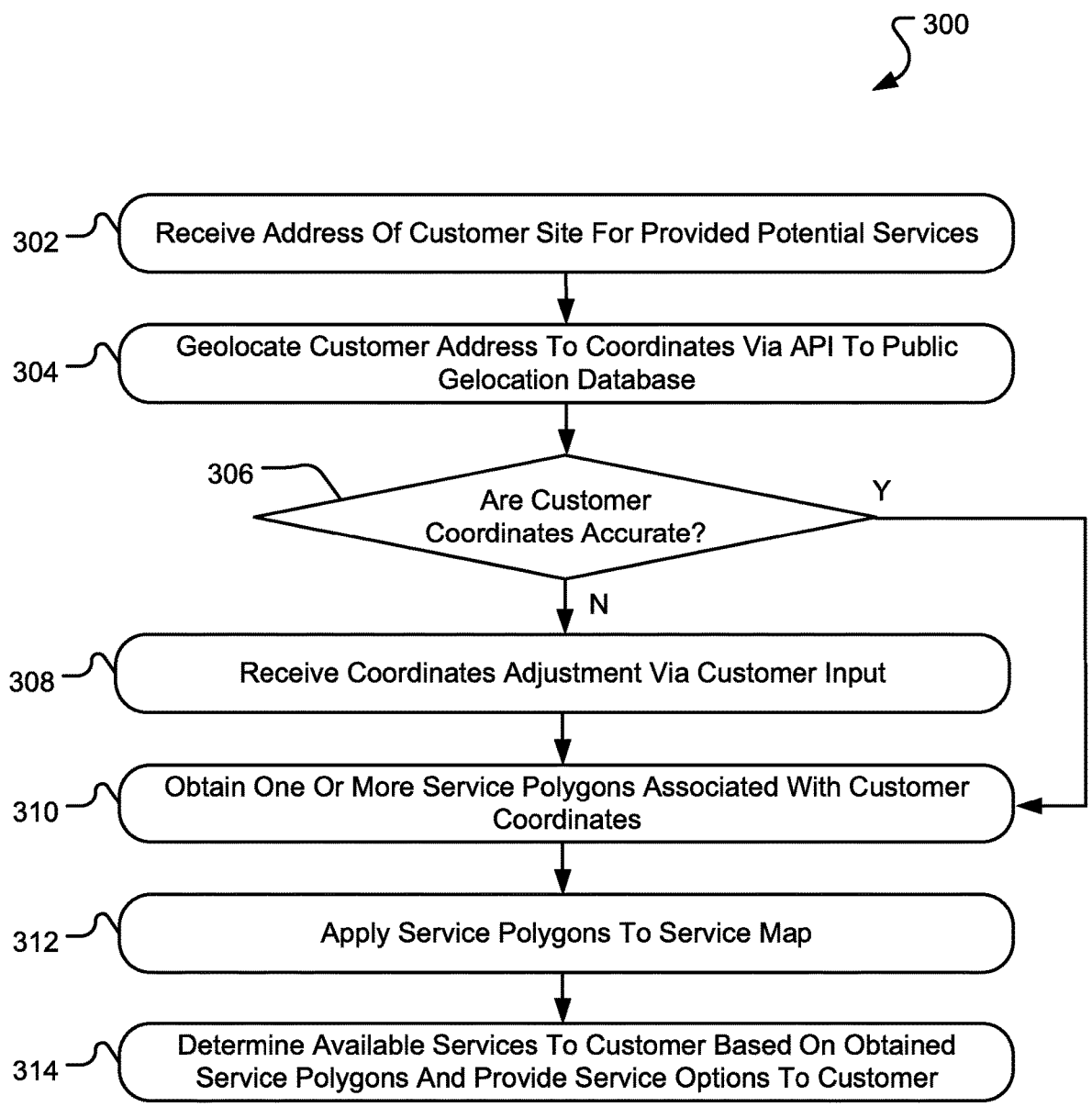
FIG. 3 is a flowchart of a method for determining services available from a communications network based on a geolocation of a customer site in accordance with embodiments of the present disclosure.

As discussed above, each node 112-116 may provide varying communication services to the sites 124-128 connected to those nodes. Thus, customers or site managers may request particular services by provided by the communication network 104 to the site. However, the customers or site managers, and even network managers, may be unaware of the services available to certain sites 124-128 without a time-consuming and intensive study of the capabilities of the corresponding nodes 112-116 and/or equipment installed in a connected node. To aid customer or network managing systems in determining available services to a particular site, one or more service polygons may be generated and utilized that correlate service areas to geolocation coordinate values that may be compared to site geolocation values. In particular, FIG. 3 is a flowchart of a method 300 for determining services available from a communications network based on a geolocation of a customer site in accordance with embodiments of the present disclosure. The operations of the method 300 of FIG. 3 may be performed by one or more network devices to determine one or more services available (or lack of available services) associated with a geolocated customer site. The operations may be performed utilizing one or more software programs, hardware components of the network devices, or a combination of both hardware and software components.

Beginning in operation 302, the network device may receive an address of a customer site as part of a request for providing network services to the customer site. For example, a customer or network manager may contact a network managing device, via a user interface, to request a network service of the network be provided to the site. The request may include an address associated with the site to receive the network service. In another example, the customer or network manager may provide the address to the network device to determine which network services may be available for the site or customer. Regardless, the address may be associated in some way with the site to receive the network service.

Figure 4:
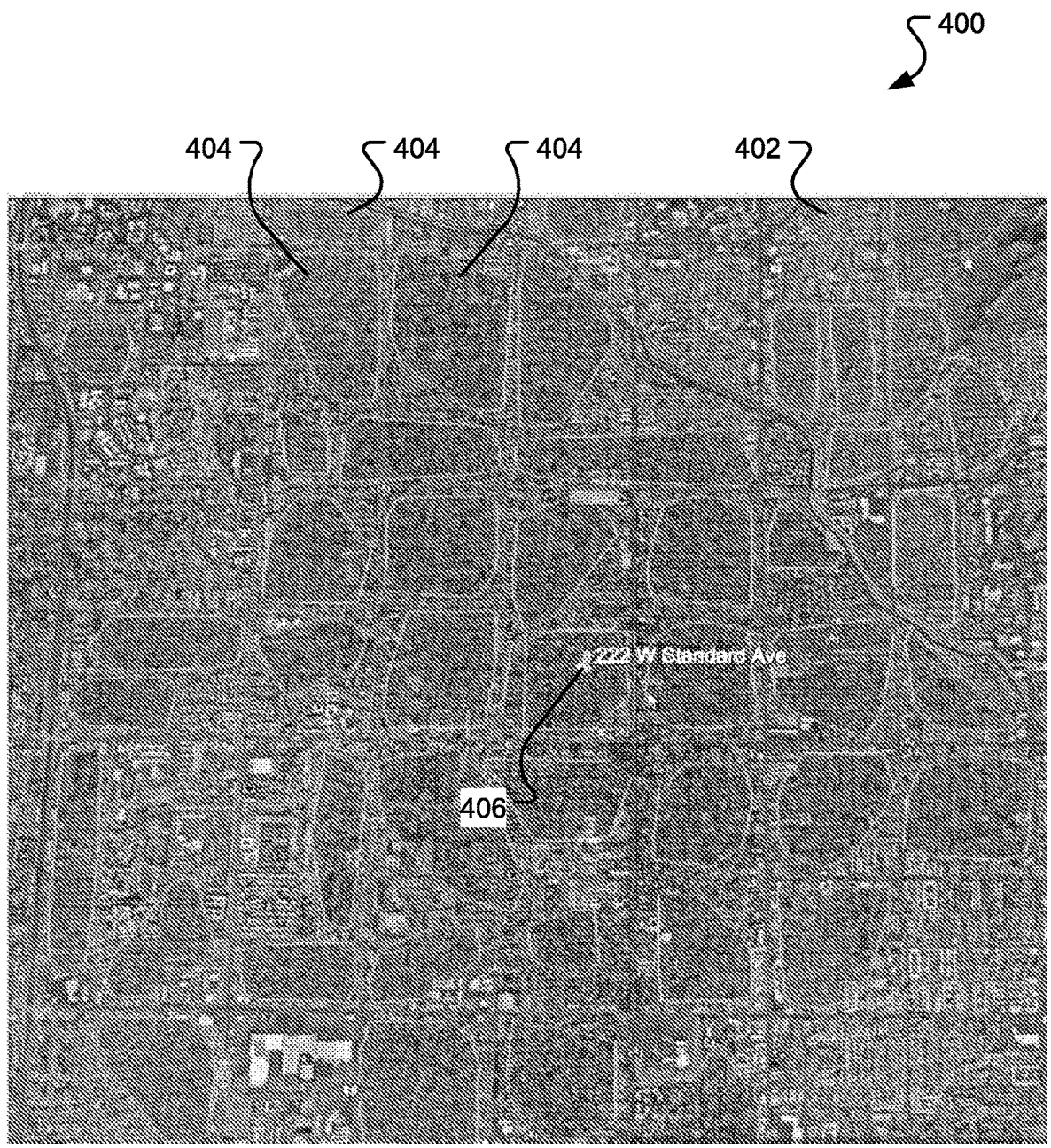
FIG. 4 is an illustrative map including service polygons determined from geolocation coordinates of network equipment in accordance with embodiments of the present disclosure.

In operation 304, the network device may correlate the received customer address to one or more geolocation coordinate values. In one implementation, the network device may access a public geolocation database via an Application Programming Interface (API) to obtain the geolocation coordinate values associated with the customer address. For example, one or more third parties may maintain geolocation information of the Earth, including topographical maps, satellite images, street information, and the like all mapped to latitude and longitude values. The third party geolocation information may be made available to others via an API. The network device may supply the received address to the geolocation database via the API to receive estimated latitude and longitude coordinate values of the address. Further, the geolocation database may provide one or more satellite images or other maps of the area surrounding the provided address. FIG. 4 illustrates an example map 402 that may be provided by the geolocation database in response to providing the address to the database. Other types of maps with various levels of information may also be provided by the geolocation database. Further, in some instances, the geolocation coordinate values associated with the address may be provided by a first database, while mapping information may be provided by a second database. In such instances, the network device may provide the address and/or the geolocation coordinates to the second database to obtain the mapping information from the second database.

In some instances, the address provided to the geolocation database may be unknown by the database. For example, many new addresses for newly built structures are not recognized for several months until after the structure becomes occupied. This may create a situation where services may be provided to the site before the address becomes official. Similarly, addresses may be entered into various databases differently. For example, some databases may spell out each part of an address ("West" for W., "Street" for St.), while others may use abbreviations for some parts of the address. In another example, some databases may include misspellings of the addresses. To contend with address database information that may be incorrect, the network device may determine, in operation 306, if the geolocation coordinate values provided by the database accurately represent the geolocation of the site to receive the network services. In one instance, the network device may provide the estimated latitude and longitude coordinates associated with the address to a customer or network manager to verify the accuracy of the coordinates. For example, the network device may provide a map similar to that illustrated in FIG. 4. In particular, the map 400 may include a satellite image 402 of a location on the Earth that includes the determined latitude and longitude coordinates associated with the address and a location marker 406 that indicates the determined coordinates within the satellite image 402. As should be appreciated, other forms of providing the estimated geolocation coordinates associated with the address to the customer or network manager may be included. The satellite image 402 including the location marker 406 may be displayed on a display device of the customer or network manager for verification of the accuracy of the coordinate values by the customer or network manager.

In one instance, the customer or network manager may provide a verification of the geolocation coordinate values. For example, a response may be provided via the user interface to verify the location marker 406 as an accurate estimation of the coordinate values of the provided address. In another example, an adjustment to the estimated geolocation coordinates may be provided via the user interface and received at the network device in operation 308. For example, the satellite image 402 and location marker 406 may be interactive such that a user of the user interface may provide an input to move the location marker 406 within the satellite image 402 to a location that is a more accurate representation of the provided address. In particular, a user may use an input device to select the location marker 406 and drag the marker to a position within the satellite image 402 (or into another satellite image) that is a more accurate representation of the site to receive the network services. A selection button may also be included in the user interface to verify the location marker 406 as the accurate site to receive the services. Upon verification of the service site via the user interface, the network device may again access the geolocation database to obtain geolocation coordinates for the indicated position within the satellite image 402 or other map interface. The verified geolocation coordinates may then be provided to the network device as the verified coordinates of the site to receive potential network services.

In operation 310, the network device may obtain one more service polygons associated with the geolocation coordinates of the provided address and verified as explained above. The service polygons define an area related to geolocation coordinates in which particular services are available. For example, a first service polygon may indicate a service area for high-speed internet service, while a second service polygon may indicate a service area for long-distance calling. Any number of service areas for any number of network services may be defined or indicated by a service polygon. Further, some service polygons may indicate a service area for future network services not yet available from the network in that particular area, but network services that are planned to be provided by the network at some future time. Further still, some service polygons may indicate areas in which services provided by the network are not available. Information associated with the network services may also be available via the service polygons, such as technical features of the service represented by the service polygons, expected service availability dates, reasons for unavailability of services, and the like. The generation of service polygons is explained in more detail below with reference to FIGS. 5 and 6.

In operation 312, the network device may apply one or more of the obtained service polygons to the service map 400 discussed above. In particular, the network device may locate, based on the geolocation coordinate values of the service polygons and the geolocation coordinate values represented in the satellite image 402, the location within the satellite image of various service polygons 404. For example and as shown in FIG. 4, the satellite image 402 may include a geographic area of the Earth defined by geographic coordinates, such as longitude and latitude coordinates. In general, the geolocation coordinates of the satellite image 402 (or other illustrated map) may be based or centered on the estimated coordinates of the provided address such that the estimate of the site location in illustrated in the map 402. The network device may then obtain one or more service polygons 404 that are contained within the geolocation coordinates of the illustrated satellite image 402. The areas defined by the service polygons 404 may also be illustrated within the satellite image 402. Visually, a user of the map 400 may see which service polygons include the site location marker 406 within its boundaries to determine if particular services are available or will be available to the site in operation 314. Different service polygons representing different network services may be cycled through in the map 400 to obtain a listing of available services, upcoming available services, or services not available for the site. In one implementation, the network device may correlate the coordinates of the obtained service polygon boundaries with the coordinates of the site to determine which service polygons the site coordinates lie within. In another implementation, a user of the map 400 may visually determine the service polygons that match with the site coordinates. Regardless of how the service polygons are determined, the network device may provide particular service options for a site based on the correlated service polygons. For example, the network device may provide an approval for a requested network service that may initiate installation of that service to the site. In another example, the network device may provide a listing of all available services from which a site manager may select to install at the site. In yet another example, the network device may provide a listing of upcoming services and potential installation dates for when those services are available for the site. Also, the network device may indicate that a particular service is not available for the site and provide a reason for the unavailability of the service. Any or all of this information may be associated with the service polygon and available to the network device upon selection of the polygon as a match to the coordinates of the site to receive the service.

Through the method 300 of FIG. 3, the availability of one or more network services provided by a communications may be determined for a particular site connected to the network. In particular, a potential site for receiving network services may be correlated to one or more geolocation coordinates, such as latitude and longitude values, instead of using an address for the site. The geolocation coordinates may be used to obtain one or more service polygons that define a service area for a network service, upcoming network service, or lack of availability of a network service within the corresponding service area. By correlating the geolocation coordinates of the site with corresponding service polygons that include those coordinates within the boundaries of the polygons, the available network services for the site may be determined and options for providing such services may be presented to customers associated with the site.

Figure 5:
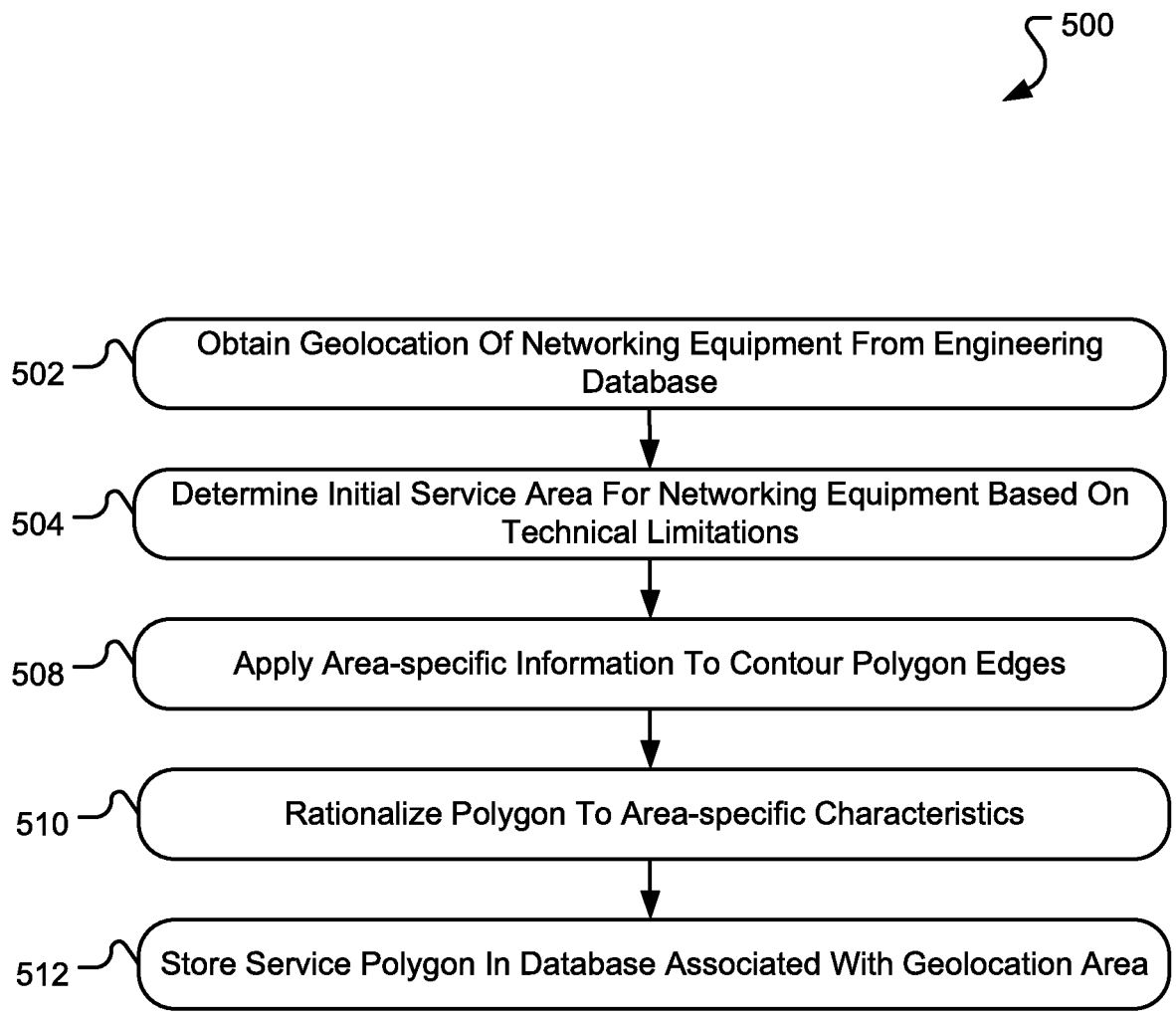
FIG. 5 is a flowchart of a method for generating service area polygons associated with a communications network and based on geolocation coordinates of network equipment in accordance with embodiments of the present disclosure.

To generate the service polygons, one or more network devices may execute the method 500 of FIG. 5. In particular, FIG. 5 is a flowchart of a method 500 for generating service area polygons associated with a communications network and based on geolocation coordinates of network equipment in accordance with embodiments of the present disclosure. Similar to above, the operations of the method 300 may be performed by one or more network devices by utilizing one or more software programs, hardware components of the network devices, or a combination of both hardware and software components.

Beginning in operation 502, the network device may obtain geolocation information of networking equipment of a wire center 102 or node 112-116 from a network engineering database. In particular, network equipment may be added to the network footprint as the network grows into new areas to service more users. For example, a network manager may determine to add an additional wire center 102 in a new development to potentially provide network services to the structures of the new development. In another example, the network manager may determine to expand services in a pre-existing wire center 102 by installing additional or upgraded networking equipment. In general, extensions or improvements to the network 104 may include an engineering phase in which network engineers design the network extension or improvement. The engineering phase may include geolocating the placement of network equipment to provide the best coverage of network services, such as by selecting a particular geographic location on a map or plot to place the equipment. In some instances, selection of the location or placement of the network equipment includes tagging the equipment in the engineering specifications with coordinate values of the selected placement. In one particular example, the network engineer may tag the network equipment for installation with a longitude and latitude coordinate values, among other location specific information such as rack number, shelf number, connection to other equipment information, etc. The coordinate values associate with the planned network equipment may be stored in an engineering database for use by installation crews when installing the new equipment and connected said equipment to the network 104. As such, the geolocation coordinate values for network equipment may be obtained by the network device from the engineering specifications such that the network device may know the latitude and longitude location of all network devices. With such information, the network device may begin to generate service polygons associated with the network equipment.

In particular, the network device may, in operation 504, determine an initial service area for network equipment based on the coordinate values of the equipment obtained from the engineering database and one or more technical limitations of the network equipment. As mentioned above, different types of network equipment may provide different types of network services. For example, a copper trunk may provide copper-fed internet service while a fiber trunk may provide fiber-based services. Further, each type of equipment may have particular technical limitations that may affect the service area of the equipment. For example, a copper-fed internet service may have a smaller available service area than a fiber-based internet service. Alternatively, the copper trunk may provide connectivity to more sites than a fiber trunk because the copper trunk may be split into more site-specific connections than a fiber trunk. Thus, an initial service area for a particular service provided by the network (and in particular the network equipment) may be determined based on the technical limitations of the network equipment providing the service to sites. In another example, the initial service area for the network equipment may be based on an acceptable noise degradation within a transmission line connected to the network equipment. For example, a first network equipment may have a transmission range of several miles based on an acceptable loss of signal within the transmission line, while other network equipment may have a range of several hundred feet based on an acceptable loss. Each available service from a network device may have an associated initial service area as the size of the initial service area may be service dependent.

Figure 6:
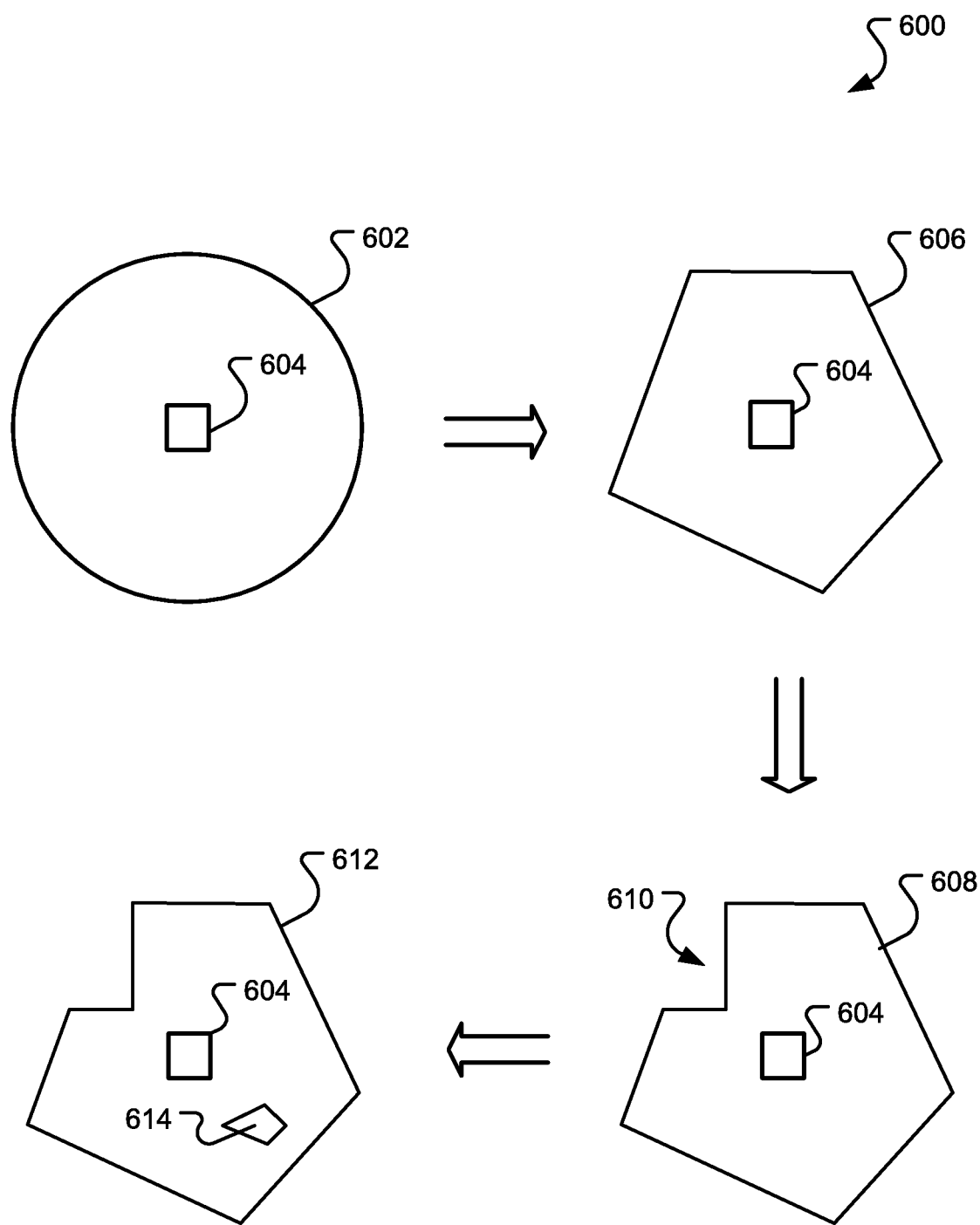
FIG. 6 is an illustration of alterations to a service area of a communications network based on network and land-based information in accordance with embodiments of the present disclosure.

FIG. 6 illustrates various alterations to a service area to generate a service polygon defining the service area for a particular service from a particular network device. As shown in FIG. 6, an initial service area 602 for a service provided by network equipment 604 may be generated based on the technical limitations of the network equipment. As shown, the initial service area may be circular, with the network equipment 604 at the center of the service area. Also, the service area 602 may incorporate the geolocated coordinate values for the network equipment 604 such that an outer boundary for providing the particular service from the network equipment 604 may be determined. In one instance, the distance from the network equipment 604 to the outer boundary of the service area 602 may be based on the technical limitations (transmission rates, transmission power, line noise, power considerations, etc.) of the network equipment 604 and network service represented by the service area 602. As the technical considerations are agnostic, initially, to the landscape in which the network equipment 604 is installed, the initial service area 602 may be circular in shape.

However, many factors may determine if network services are available from the network equipment 604 in addition to the technical limitations of the service. For example, land-based barriers may be present at the location of the network equipment 604 that may prevent the installation of transmission lines across the barrier. Rivers, streams, lakes, mountains, structures, and the like are all examples of potential land-based barriers to running a transmission line from the network equipment 604 to a site. Therefore, the network device may begin altering the initial service area 602 in response to land-based information obtained from one or more public databases in operation 508. For example, the network device may access the geolocation database discussed above to obtain a topographical map surrounding the network equipment 604. In one instance, the network device may provide the geolocation coordinates of the network equipment 604 to the geolocation database to obtain the map of the surrounding area of the equipment. The network device may analyze the retrieved topographical map to detect one or more land-based barriers to providing a service to a site. For example, an analysis of the topographical map may indicate a river that bisects the initial service area 602. The network device may determine, through application of one or more business or network engineering rules, that a transmission from the network equipment 604 may not cross the detected river such that sites located on the opposite side of the river from the network equipment 604 may not receive services from that network equipment 604. Rather, another installation of network equipment may provide services to sites on the opposite side of the river. In a similar manner, lakes, hills, mountains, existing structures, and the like may prevent installation of transmission lines to sites on the opposite of the boundaries. Other databases and maps may also be used by the network device to determine land-based boundaries within the initial service area 602. For example, land plots maintained by cities or townships may be accessed to determine potential expansions of an area, satellite images of the area may be analyzed to detect land-based boundaries, legal constraints for installing transmission lines or network equipment may be obtained from another database, and the like. Regardless of the type of land-based information obtained, the network device may process each piece of information obtained from the databases through one or more business rules of the network to determine the specifics of the initial service area 602 that may provide a barrier to providing a service to a site.

As shown in FIG. 6, the network device may alter the boundaries of the initial service area 602 in response to the detected land-based boundaries. The alternations to the service area may begin to remove portions of the initial service area 602. Service polygon 606 is an example of an altered service area for a network equipment 604 based on detected land-based boundaries within the initial service area. This process may limit the scope of the service area 606 in response to detected boundaries such that a true understanding of the available area for the service represented by the service polygon 606 may be obtained. The example service polygon 606 illustrated in FIG. 6 is but one example and any alterations to the boundaries of the service area may be performed by the network device.

The network device may make additional alterations to the service area 606 in response to additional information obtained from one or more databases. For example, in operation 510, the network device may rationalize the service polygon area to specific characteristics of the land within the service area or based on one or more business rules. For example, the service polygon may be adjusted to overlay an edge of the polygon along a street to delineate available service to structures located on one side of the street. Another rationalization may be based on business rules of the network, such as identifying areas within the service area 606 in which providing the service exceeds a cost threshold set by the network management. Another business decision of the network management may be a capacity threshold for the service area 606 such that areas of high-density population may be removed from the available service polygon 606 to ensure the capacity of the network equipment 604 is not exceeded. In general, any business decision or characteristic of the area included in the service polygon 606 may be used to further alter the boundaries of the service polygon.

Returning to FIG. 6, service polygon 608 illustrates an additional boundary adjustment to the service area based on the characteristics of the area included in the service polygon and/or one or more business rules for defining the service polygon 606. For example, the adjusted area 610 may be removed from the area defined by the service polygon 608 to follow one or more streets or roads through the service area. In another example, the area 610 may include barriers or site density that exceed a cost threshold to provide the network service to sites within the area. Regardless of the reason, the boundary of the service polygon 608 may be adjusted in response to additional information of the service area and the network operations.

In some instances, an area within the service polygon 610 may be removed in response to one or more of adjustment reasons discussed above (land-based barriers, land-based characteristics, business rules, etc.). These adjustments may indicate that a portion within the service polygon 612 be indicated as an area in which the network service is unavailable. Service polygon 612 is an example of a service polygon in which a portion 614 within the service area has been removed. The removal of the interior portion 614 of the service polygon 612 may be made for the same reasons as described above for adjusting the boundaries of the service polygon.

The service polygons generated and adjusted by the network device may, in a similar manner, provide an area in which a particular service is currently unavailable. The unavailable service polygon may be generated based on a planned installation of upgrade of a network equipment 604. Thus, the unavailable service area may be associated with information indicating the planned availability of the network service such that sites may plan to receive the related service at a particular time. An unavailable service polygon may be generated as if the service is available through the operations described above, but may carry the planned installation information of the network equipment 604 to distinguish from currently available service polygons.

In operation 512, the service polygons associated with a network equipment may be stored in a database for use by the network device to provide service availability information to potential sites. The service polygons may be stored and associated with an indication of the network equipment and/or the geolocation coordinates of the network equipment. Returning to FIG. 4, several service polygons 404 are illustrated in the map 400. The polygons may be retrieved based on a requested network service and/or geolocation coordinates of a site to potentially receive the network service. Through the service polygons 404, a user of the map 400 may determine where particular services are available or unavailable for network planning purposes.

Figure 7:
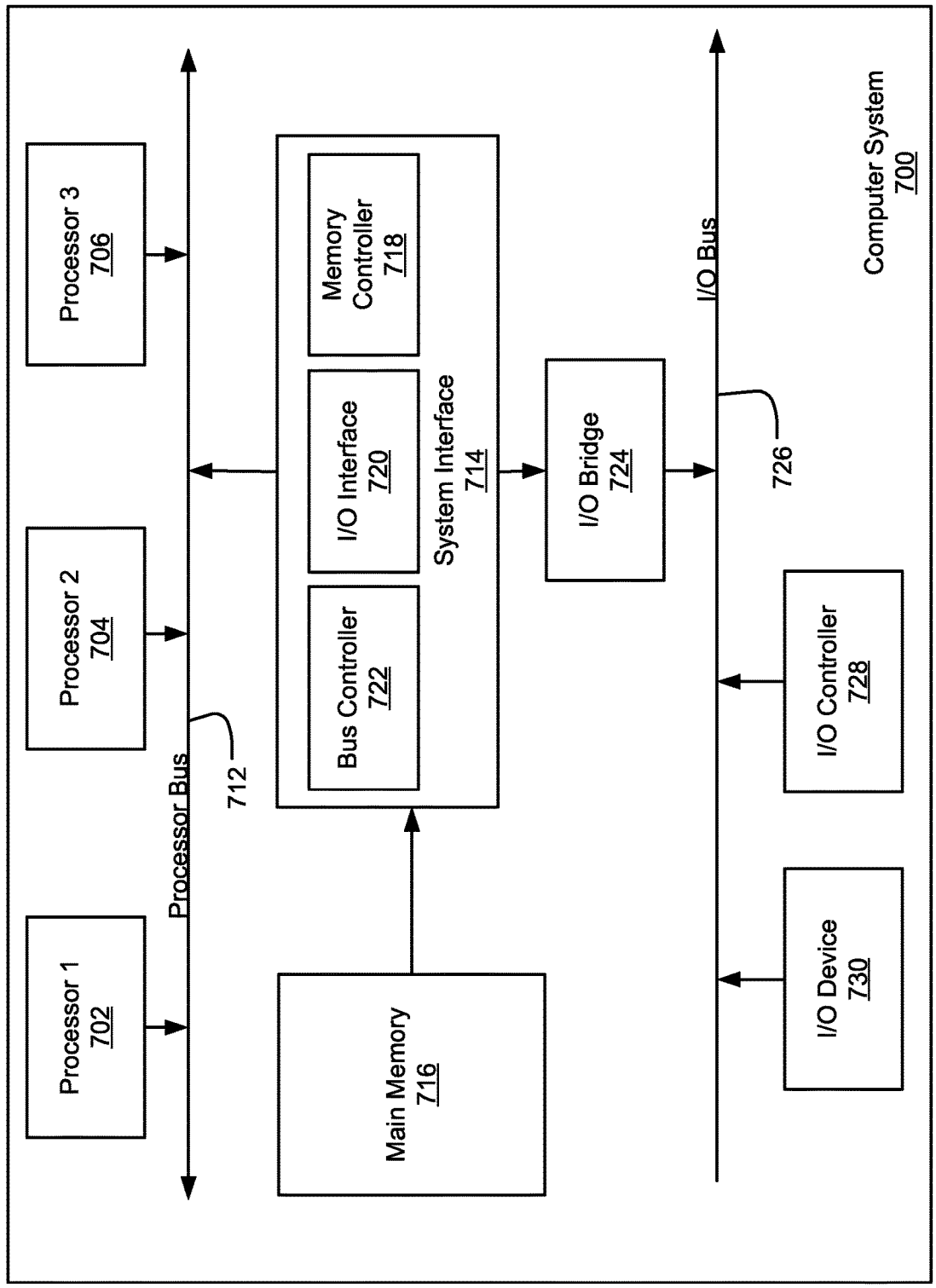
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the components of the network disclosed above. For example, the computing system 700 of FIG. 7 may be the optical domain controller 130 discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 714 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a network, the method comprising:
obtaining geolocation coordinates of an address received at a computing device, the received address corresponding to a potential termination site for a communications network;
obtaining, based on the geolocation coordinates and from a database in communication with the computing device, a service area polygon comprising a plurality of geographic boundaries defining an area of an available network service and which contains the geolocation coordinates of the potential termination site;
correlating, in a service map of a geographic area, the service area polygon with the geolocation coordinates of the potential termination site, wherein the correlation corresponds to an availability of the network service to the potential termination site;
altering the plurality of geographic boundaries of the service area polygon based on a network operating business rule; and
displaying the correlation of the service area polygon with the geolocation coordinates of the potential termination site in the service map.

2. The method of claim 1 wherein obtaining the geolocation coordinates of the received address comprises:
transmitting, via an application programming interface (API), the received address to a geolocation database; and
receiving the geolocation coordinates of the address from the database.

3. The method of claim 1 further comprising:
receiving, via a user interface, an input verifying the geolocation coordinates of the received address.

4. The method of claim 1 wherein network equipment of the network comprises a transmission distance limitation of network equipment, the transmission distance limitation based on an acceptable noise threshold of the network equipment.

5. The method of claim 1 wherein network equipment of the network comprises a service type available from the network equipment based on a type of the network equipment.

6. The method of claim 1 wherein the network operating business rule comprises a quality of service value threshold associated with the network service.

7. A system for managing a network, the system comprising:

a processor in communication a database maintaining geolocation coordinate values corresponding to an address; and a non-transitory memory comprising instructions encoded thereon, the instructions, when executed by the processor, are operable to:

define a service polygon comprising a plurality of geographic boundaries defining an area of a network service based on a geographic location of network equipment configured to provide the network service;

alter the plurality of geographic boundaries of the service area polygon based on a network operating business rule;

display, in a graphical user interface including a service map, an overlay of the geolocation coordinate values corresponding to the address and the service polygon associated with the network service when the geolocation coordinate values are located within the plurality of geographic boundaries of the service polygon.

8. The system of claim 7 wherein the instructions are further operable to:

transmit, via an application programming interface (API), the address to the database to request the geolocation coordinate values corresponding to an address.

9. The system of claim 7 wherein the geolocation coordinate values associated with the address comprise a latitude value and a longitude value.

10. The system of claim 9 wherein the instructions are further operable to:

display, on a display device in communication with a communication port, the graphical user interface; and receive, via the user interface, an input verifying the latitude value and a longitude value associated with address.

11. The system of claim 7 wherein the network service comprises a fiber-based connection between a site associated with the address and the network equipment configured to provide the network service.

12. The system of claim 7 wherein the network service comprises an indication of a future service provided by the network and the service polygon comprises an installation schedule for the future service associated with the service polygon.

13. The system of claim 7 wherein the instructions are further operable to:

generate an initial service area polygon comprising an initial plurality of geographic boundaries based on the geographic location of the network equipment; and alter the initial plurality of geographic boundaries of the initial service area polygon.

14. The system of claim 13 wherein the initial plurality of geographic boundaries of the initial service area polygon is based on a technical feature of the network equipment to provide the network service.

15. The system of claim 13 wherein altering the initial plurality of geographic boundaries of the initial service area polygon is based on a physical barrier obtained from a topographical map comprising the geographic location of the network equipment.

16. The system of claim 7 wherein the network equipment is configured to provide a Passive Optical Network service for the area of the network service defined by the plurality of geographic boundaries.

17. A non-transitory computer-readable storage medium, storing a computer program, wherein the computer program, when executed by a processor, causes the processor to perform a method comprising:

receive, at a computing device, geolocation coordinates of an address corresponding to a potential termination site for a communications network;

obtain, based on the geolocation coordinates and from a database in communication with the computing device, a service area polygon comprising a plurality of geographic boundaries defining an area of an available network service and which contains the geolocation coordinates of the potential termination site;

correlate, in a service map of a geographic area, the service area polygon with the geolocation coordinates of the potential termination site, wherein the correlation corresponds to an availability of the network service to the potential termination site;

alter the plurality of geographic boundaries of the service area polygon based on a network operating business rule; and display, on a display device, the correlation of the service area polygon with the geolocation coordinates of the potential termination site in the service map.

* * * * *